(12) United States Patent
Clarner

(10) Patent No.: US 7,716,792 B2
(45) Date of Patent: May 18, 2010

(54) TOUCH FASTENER ELEMENTS

(75) Inventor: Mark A. Clarner, Concord, NH (US)

(73) Assignee: Velcro Industries B.V., Curacao (AN)

( * ) Notice: Subject to any disclaimer, the term of this patent is extended or adjusted under 35 U.S.C. 154(b) by 1068 days.

(21) Appl. No.: 10/688,031

(22) Filed: Oct. 15, 2003

(65) Prior Publication Data

US 2005/0081344 A1 Apr. 21, 2005

(51) Int. Cl.
*A44B 18/00* (2006.01)
(52) U.S. Cl. .......................................... 24/452; 24/442
(58) Field of Classification Search ........... 24/442–452; 428/99, 100; 264/167, 280, 285, 296, 442, 264/49
See application file for complete search history.

(56) References Cited

U.S. PATENT DOCUMENTS

| | | | |
|---|---|---|---|
| 3,387,345 A | 6/1968 | Savoir | 24/446 |
| 3,417,440 A * | 12/1968 | Billarant | 24/446 |
| 3,426,363 A | 2/1969 | Girard | 2/338 |
| 4,165,555 A | 8/1979 | Boxer et al. | 24/444 |
| 4,402,690 A | 9/1983 | Redfern | 604/391 |
| 4,410,327 A | 10/1983 | Baggaley | 604/391 |
| 4,870,725 A | 10/1989 | Dubowik | 24/442 |
| 4,984,339 A | 1/1991 | Provost et al. | 24/452 |
| 5,058,247 A * | 10/1991 | Thomas et al. | 24/448 |
| 5,116,563 A * | 5/1992 | Thomas et al. | 264/167 |
| 5,176,670 A | 1/1993 | Roessler et al. | 604/391 |
| 5,318,741 A | 6/1994 | Thomas | 264/519 |
| 5,325,569 A | 7/1994 | Goulait et al. | 24/448 |
| 5,326,415 A | 7/1994 | Thomas et al. | 156/244.11 |
| 5,326,612 A | 7/1994 | Goulait | 428/100 |
| 5,339,499 A | 8/1994 | Kennedy et al. | 24/452 |
| 5,368,549 A | 11/1994 | McVicker | 602/6 |
| 5,369,852 A | 12/1994 | Higashinaka | 24/446 |
| 5,369,853 A | 12/1994 | Okawa et al. | 24/446 |
| 5,392,498 A | 2/1995 | Goulait et al. | 24/452 |
| 5,399,177 A | 3/1995 | Blaney et al. | 604/389 |
| 5,399,418 A | 3/1995 | Hartmanns et al. | 428/218 |
| 5,540,673 A | 7/1996 | Thomas et al. | 604/391 |
| 5,551,130 A | 9/1996 | Tominaga et al. | |
| 5,586,371 A * | 12/1996 | Thomas | 24/452 |
| 5,604,963 A | 2/1997 | Akeno et al. | |
| 5,607,345 A | 3/1997 | Barry et al. | 451/539 |
| 5,615,460 A | 4/1997 | Weirich et al. | 24/446 |

(Continued)

FOREIGN PATENT DOCUMENTS

CN 1047021 A 11/1990

(Continued)

OTHER PUBLICATIONS

PCT/US02/02570, International Search Report.

(Continued)

*Primary Examiner*—Robert J Sandy
(74) *Attorney, Agent, or Firm*—Fish & Richardson P.C.

(57) ABSTRACT

Molded touch fastener elements or hooks that feature a head or crook that is quite large with respect to the size of the overall hook, or with respect to the entrance below the hook heads through which the loops must pass for engagement to occur. The hooks are particularly useful for high cycle life applications when mated with low loft loops.

38 Claims, 6 Drawing Sheets

U.S. PATENT DOCUMENTS

| | | | |
|---|---|---|---|
| 5,655,268 A | 8/1997 | Keyaki et al. | 24/114.9 |
| 5,669,120 A | 9/1997 | Wessels et al. | 24/446 |
| 5,781,969 A | 7/1998 | Akeno et al. | |
| 5,845,375 A | 12/1998 | Miller et al. | 24/452 |
| 5,875,527 A | 3/1999 | Lacey et al. | |
| 5,900,350 A | 5/1999 | Provost et al. | |
| 5,953,797 A | 9/1999 | Provost et al. | |
| 5,974,635 A | 11/1999 | Murasaki | 24/446 |
| 6,039,911 A | 3/2000 | Miller et al. | 264/280 |
| 6,054,091 A * | 4/2000 | Miller et al. | 264/442 |
| 6,066,281 A | 5/2000 | Provost | 264/167 |
| 6,131,251 A | 10/2000 | Provost | 24/452 |
| 6,163,939 A | 12/2000 | Lacey et al. | 24/452 |
| 6,209,177 B1 | 4/2001 | Murasaki | |
| 6,248,419 B1 * | 6/2001 | Kennedy et al. | 24/442 |
| 6,579,161 B1 * | 6/2003 | Chesley et al. | 451/538 |
| 2002/0116799 A1 * | 8/2002 | Martin et al. | 24/452 |
| 2002/0124359 A1 | 9/2002 | Murasaki et al. | 24/452 |
| 2003/0012921 A1 * | 1/2003 | Gallant et al. | 428/100 |
| 2003/0182776 A1 | 10/2003 | Ausen et al. | 24/452 |
| 2004/0068848 A1 * | 4/2004 | Ausen et al. | 24/452 |

FOREIGN PATENT DOCUMENTS

| | | |
|---|---|---|
| CN | 1057575 A | 1/1992 |
| CN | 1374050 A | 10/2002 |
| EP | 0382024 | 8/1990 |
| WO | WO 87/06522 * | 11/1987 |
| WO | WO 02/060294 A1 | 8/2002 |

OTHER PUBLICATIONS

*Second Office Action*, Chinese Patent Application No. 2004800371538, dated Jan. 16, 2009.

* cited by examiner

TOUCH FASTENER ELEMENTS

TECHNICAL FIELD

This invention relates to male touch fastener components having arrays of fastener elements with stems extending integrally from a sheet of resin.

BACKGROUND

Early male touch fastener products were generally woven materials, with hooks formed by cut filament loops. More recently, arrays of very small touch fastener elements have been formed by molding the fastener elements, or at least the stems of the elements, of resin forming an interconnecting sheet of material.

In most applications, male fastener elements are designed to releasably engage with a mating female fastener component carrying a field of loops or fibers. To engage the loops, the male fastener elements must penetrate the field of fibers at least until the tips of the engaging fastener element heads have sufficiently extended beyond some of the fibers, such that the fibers can be engaged within the crooks of the heads. Thus, enhancing penetration tends to lead to longer, more slender hooks.

Subsequent to engagement, retention of an engaged fiber or loop depends, at least for loads within the ability of the loop to resist breakage, upon resistance of the hook to distention and/or breakage. Distention is the opening of the crook under load of an engaged loop. For high cycle life applications, breakage of either both loops and hooks is undesirable. Thus, the ability of the fastening to resist peel loads in such applications is generally limited by the ability of the hook to resist distention.

Unfortunately, for many applications increasing the rigidity of hooks designed for maximum loop penetration, to increase their peel resistance, is either undesirable or impractical. For example, many applications require a gentle 'feel' of the male fastener element array against the skin.

Further improvements in the overall design of male fastener elements, particularly those formed or molded of resin and arranged in large numbers upon a surface for engaging loops or fibers, are desired. Preferably, such improved fastener elements will be readily and efficiently manufacturable without great advances in manufacturing methods.

SUMMARY

We have found configurations of male fastener elements that provide good overall peel resistance, particularly when mated with low profile loop materials, while still exhibiting good loop field penetration.

In several aspects of the invention, the design of the resulting hooks features a head or crook that is quite large with respect to the size of the overall hook, or with respect to the entrance below the hook heads through which the loops must pass for engagement to occur, as compared to many prior molded hooks.

According to one aspect of the invention, a touch fastener component has a sheet-form base and an array of fastener elements. Each fastener element includes a molded stem and a head extending for the stem. The molded stem extends outwardly from and integrally with the sheet-form base, and the head extends forward from a distal end of the stem to a tip, the head having a lower surface forming a crook for retaining loops. Specifically, the head has an overall height, measured perpendicular to the sheet-form base from a lowermost extent of the tip to an uppermost extent of the head, that is greater than 55 percent of an overall height of the fastener element, measured perpendicular to the sheet-form base.

In some embodiments, each fastener element has multiple heads extending in different directions and forming separate crooks. Each fastener element may have two heads extending in essentially opposite directions, for example. Preferably, each such fastener element defines an upper well between the two oppositely-directed heads, the well extending down to a height, measured perpendicularly from the base, of at least about 70 percent of the overall height of one of the two oppositely-directed heads. Each such fastener element preferably has an overall length between opposite extents of the oppositely-directed heads, measured parallel to the base, of at least 1.8 times the overall height of the fastener element.

Each fastener element head tip preferably defines an entrance height, measured perpendicular to the sheet-form base below a lowermost extent of the tip, of between about 7 and 12 millimeters.

Preferably, the ratio of the overall height of the crook, measured perpendicular to the sheet-form base from a lowermost extent of the tip to an uppermost extent of the crook, to an entrance height measured perpendicular to the sheet-form base below a lowermost extent of the tip, is greater than 0.6.

Preferably, the overall head height is less than 60 percent of the overall height of the fastener element.

In some cases, the tip extends toward the base.

The lower surface of the head, forming the crook, is preferably arched.

In some cases, the head and stem form a unitary molded structure, such as one in which the head has a surface of resin cooled against a mold surface.

In some instances, the stem has opposing surfaces defined by severed resin, such as from being formed in a cut-and-stretch process.

In some applications, the stem and head have side surfaces lying in parallel planes.

The crook, in some embodiments, overhangs a surface of the stem. In preferred embodiments, the crook overhangs a stem surface that extends at an inclination angle of between about 20 and 30 degrees with respect to a normal to the base.

Each fastener element preferably has an overall height of between about 10 and 50 millimeters, measured from and perpendicular to the base, more preferably between about 20 and 30 millimeters.

Each fastener element head preferably has an overall height of between about 10 and 20 millimeters, measured perpendicular to the sheet-form base from a lowermost extent of the tip of the head to an uppermost extent of the head.

In some cases, each crook defines an overall crook height, measured perpendicular to the sheet-form base from a lowermost extent of the tip to an uppermost extent of the crook, of at least 6.0 millimeters.

In some applications, the touch fastener component includes a backing material laminated to a side of the base opposite the fastener elements. The backing material may provide reinforcement, or carry engageable loops, for example.

The fastener elements are preferably arranged in a density of at least 350 fastener elements per square inch of the base.

The fastener elements together preferably cover at least 20 percent of an overall surface area of the base from which the fastener elements extend.

Various preferred embodiments of the following aspects of the invention also include various combinations of the above-described, preferred features.

According to another aspect of the invention, a touch fastener component has a sheet-form base and an array of fastener elements. Each fastener element includes a molded stem and a head extending for the stem. The molded stem extends outwardly from and integrally with the sheet-form base, and the head extends forward from a distal end of the stem to a tip, the head having a lower surface forming a crook for retaining loops. Specifically, at least one head has an overall height, measured perpendicular to the sheet-form base from a lowermost extent of the tip of the head to an uppermost extent of the head, that is greater than half of an overall height of the fastener element, measured perpendicular to the sheet-form base.

In some cases, both of the heads have overall heights that are greater than half of the overall height of the fastener element.

According to another aspect of the invention, a touch fastener component has a sheet-form base and an array of fastener elements. Each fastener element includes a molded stem and a head extending for the stem. The molded stem extends outwardly from and integrally with the sheet-form base, and the head extends forward from a distal end of the stem to a tip, the head having a lower surface forming a crook for retaining loops. Specifically, the fastener element has a bulk aspect of more than 0.020 inch (0.51 mm). 'Bulk Aspect' is defined as a ratio of the product of an overall length of the fastener element, measured parallel to the sheet-form base in the engagement direction above an elevation of the tip, and fastener element thickness, measured parallel to the sheet-form base and the engagement direction at the elevation of the tip, to an overall height of the fastener element, measured perpendicular to the sheet-form base.

According to another aspect of the invention, a touch fastener component has a sheet-form base and an array of fastener elements. Each fastener element includes a molded stem and a head extending for the stem. The molded stem extends outwardly from and integrally with the sheet-form base, and the head extends forward from a distal end of the stem to a tip, the head having a lower surface forming a crook for retaining loops. Specifically, the ratio of an overall height of the crook, measured perpendicular to the sheet-form base from a lowermost extent of the tip to an uppermost extent of the crook, to an entrance height measured perpendicular to the sheet-form base below a lowermost extent of the tip, is greater than 0.6.

According to another aspect of the invention, a touch fastener component has a sheet-form base and an array of fastener elements. Each fastener element includes a molded stem and a head extending for the stem. The molded stem extends outwardly from and integrally with the sheet-form base, and the head extends forward from a distal end of the stem to a tip, the head having a lower surface forming a crook for retaining loops. Specifically, the ratio of an overall length of the fastener element, measured parallel to the sheet-form base in the engagement direction, to an overall height of the fastener element, measured perpendicular to the sheet-form base, is greater than 1.8.

Another aspect of the invention features a method of forming a touch fastener component having a sheet-form base and an array of fastener elements. Molten resin is introduced to a peripheral surface of a rotating mold roll defining an array of inwardly-extending cavities each including a stem region extending inwardly from the peripheral surface, and a head region extending laterally from a distal end of the stem region to a blind tip. The head region is bounded by an outer surface forming a crook. Specifically, each head region having an overall height, measured radially from a lowermost extent of the tip to an innermost extent of the head region, that is greater than 55 percent of an overall depth of the cavity, measured radially from the peripheral surface. Sufficient pressure is applied to force the resin into the cavities to mold an array of fastener elements having upper wells corresponding to the protrusions, while forming a sheet of the resin on the peripheral surface of the mold roll. The resin is cooled in the cavities. Finally, the fastener elements are freed from the mold cavities by stripping the sheet of resin from the surface of the mold roll, thereby pulling heads of the fastener elements formed in the head regions of the cavities through the stem regions of the cavities to remove the fastener elements from the cavities.

Another aspect of the invention features a method of forming a touch fastener component having a sheet-form base and an array of fastener elements. Molten resin is introduced to a peripheral surface of a rotating mold roll defining an array of inwardly-extending cavities each including a stem region extending inwardly from the peripheral surface, and a head region extending laterally from a distal end of the stem region to a blind tip. The head region is bounded by an outer surface forming a crook. Specifically, at least one of the head regions has an overall height, measured radially from a lowermost extent of the tip to an innermost extent of the head region, that is greater than half of an overall depth of the cavity, measured radially from the peripheral surface. Sufficient pressure is applied to force the resin into the cavities to mold an array of fastener elements having upper wells corresponding to the protrusions, while forming a sheet of the resin on the peripheral surface of the mold roll. The resin is cooled in the cavities. Finally, the fastener elements are freed from the mold cavities by stripping the sheet of resin from the surface of the mold roll, thereby pulling heads of the fastener elements formed in the head regions of the cavities through the stem regions of the cavities to remove the fastener elements from the cavities.

Another aspect of the invention features a method of forming a touch fastener component having a sheet-form base and an array of fastener elements. Molten resin is introduced to a peripheral surface of a rotating mold roll defining an array of inwardly-extending cavities each including a stem region extending inwardly from the peripheral surface, and a head region extending laterally from a distal end of the stem region to a blind tip. The head region is bounded by an outer surface forming a crook. Specifically, each cavity has a bulk aspect, defined as a ratio of the product of an overall length of the cavity, measured circumferentially outside an elevation of the tip, and cavity thickness, measured axially along the mold roll, to an overall depth of the fastener element cavity, measured radially from the peripheral surface, of more than 0.020 inch (0.51 mm). Sufficient pressure is applied to force the resin into the cavities to mold an array of fastener elements having upper wells corresponding to the protrusions, while forming a sheet of the resin on the peripheral surface of the mold roll. The resin is cooled in the cavities. Finally, the fastener elements are freed from the mold cavities by stripping the sheet of resin from the surface of the mold roll, thereby pulling heads of the fastener elements formed in the head regions of the cavities through the stem regions of the cavities to remove the fastener elements from the cavities.

Another aspect of the invention features a method of forming a touch fastener component having a sheet-form base and an array of fastener elements. Molten resin is introduced to a peripheral surface of a rotating mold roll defining an array of inwardly-extending cavities each including a stem region extending inwardly from the peripheral surface, and a head region extending laterally from a distal end of the stem region to a blind tip. The head region is bounded by an outer surface forming a crook. Specifically, each crook has an overall height, measured radially from a lowermost extent of the tip to an innermost extent of the crook, that is greater than 0.6 times a radial distance from the peripheral surface to the tip. n overall depth of the cavity, measured radially from the peripheral surface. Sufficient pressure is applied to force the resin into the cavities to mold an array of fastener elements having upper wells corresponding to the protrusions, while forming a sheet of the resin on the peripheral surface of the mold roll. The resin is cooled in the cavities. Finally, the fastener elements are freed from the mold cavities by stripping the sheet of resin from the surface of the mold roll, thereby pulling heads of the fastener elements formed in the head regions of the cavities through the stem regions of the cavities to remove the fastener elements from the cavities.

The improvements in hook design disclosed herein can provide a touch fastener product with particularly good peel resistance and other performance characteristics, and are especially applicable to hooks (whether J-hooks or multiple-crook hooks) that are to be mated with loop fields of generally open loop distribution. The large proportion of the hook heads and crooks, with respect to the overall size of the hooks, can enable the resulting closure to provide performance characteristics more typical of woven hook products, but at a much lower overall profile. Obtaining a lower closure profile is advantageous for many applications, in that such a closure is less cumbersome with respect to the article to which it is attached, and less likely to interfere with the aesthetic appearance of the article. Thus, such hook products should find application on garments and footwear, as well as backpacks, tents, sporting gear, etc.

In one sense, the high ratio of head footprint to hook height described herein is counter to the presumption that engagement is enhanced by lower footprints and higher hook heights. I have found that good engagement properties can be obtained even with such high ratios, with beneficial effect on closure strength, particularly as mated with a loop component with large loop filament diameters, high loop resiliency and open loop distribution.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
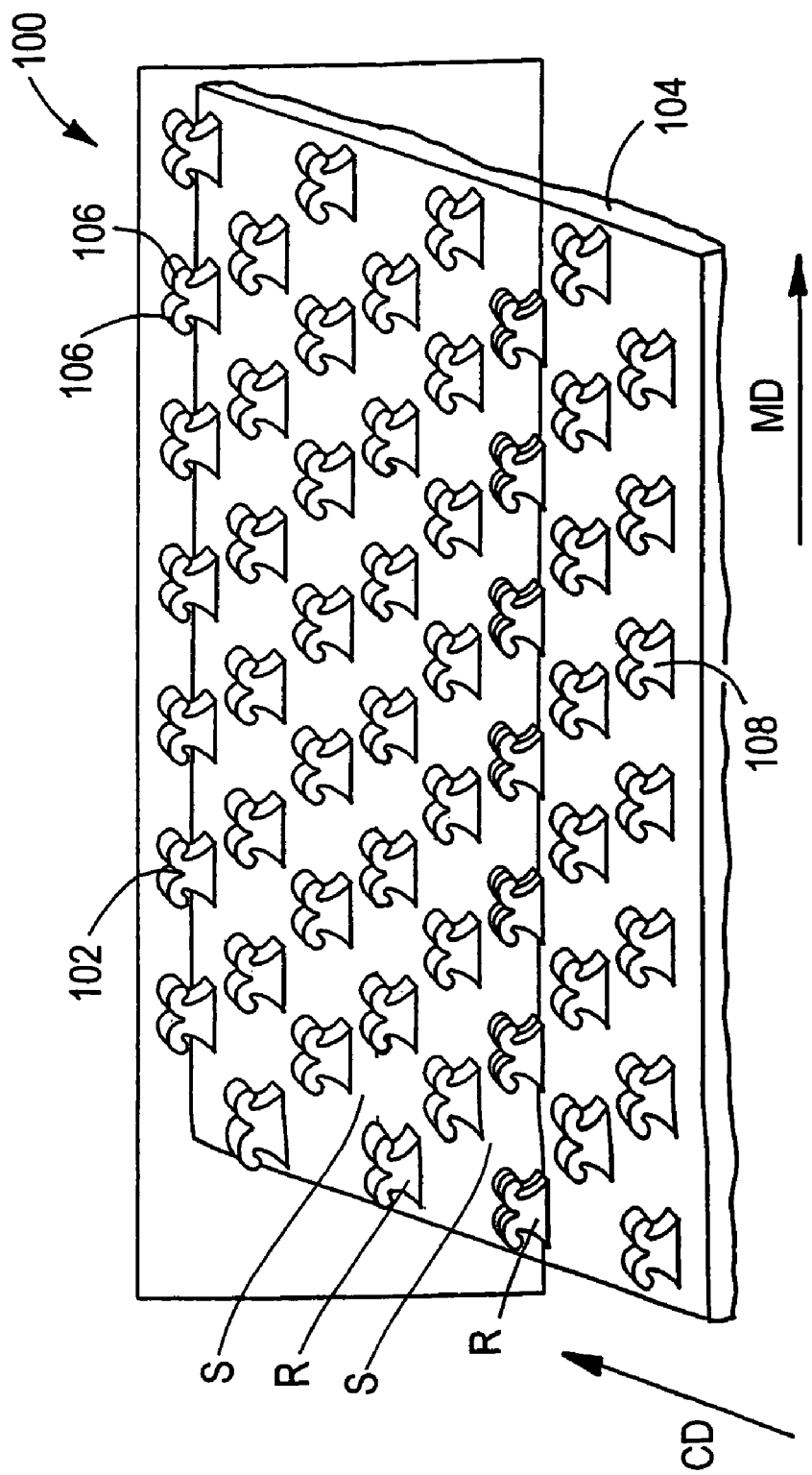
FIG. 1 is a perspective view of male fastener component with palm tree-shaped hooks.
Figure 2:
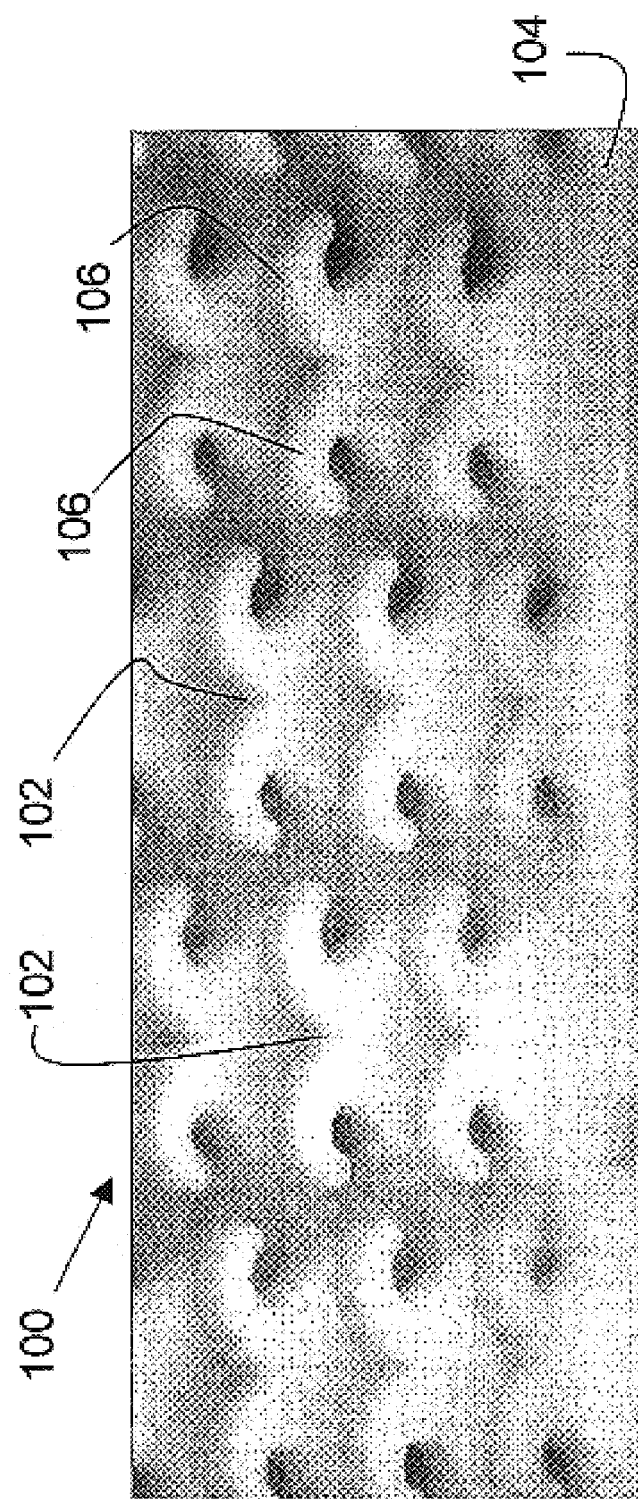
FIG. 2 is an enlarged photograph of an example of the fastener of FIG. 1.

Referring to FIGS. 1 and 2, a male touch fastener component 100 includes a field of fastener elements 102 arranged in rows R extending outwardly from and integrally with a sheet-form base 104. Spacing S between rows may be controlled by the manufacturing process and will be discussed further below. Fastener elements 102 are palm tree-shaped hooks and are engageable in two directions along a plane (i.e., an engagement plane) perpendicular to sheet-form base 104 in the direction of rows R. Each fastener element 102 includes two heads 106 extending from a single stem 108.

Male fastener component 100 is designed to, for example, strongly engage a low pile height, loop touch fastener component, particularly a loop component with loops formed of, for example, a high strength multifilament yarn or a high strength monofilament. High strength loops are desirable for fasteners for high strength applications requiring high cycle life, as the resist breakage at higher peel loads. Typically, high strength yarns and monofilaments are made by extrusion. Generally, the process includes a drawdown step to impart orientation on the yarn or monofilament so as to improve, for example, tenacity of the yarn or monofilament. High strength fibers may also be formed by other methods, for example, by solution spinning. Suitable high strength loop filament materials include, for example, polyamides, polyesters, polyurethanes, ultra-high molecular weight solution spun polyethylene (e.g., SPECTRA® polyethylene), aramids (e.g., KEVLAR®), acrylics and rigid rod polymers like poly(p-phenylene-2,6-benzobisoxazole).

Figure 3:
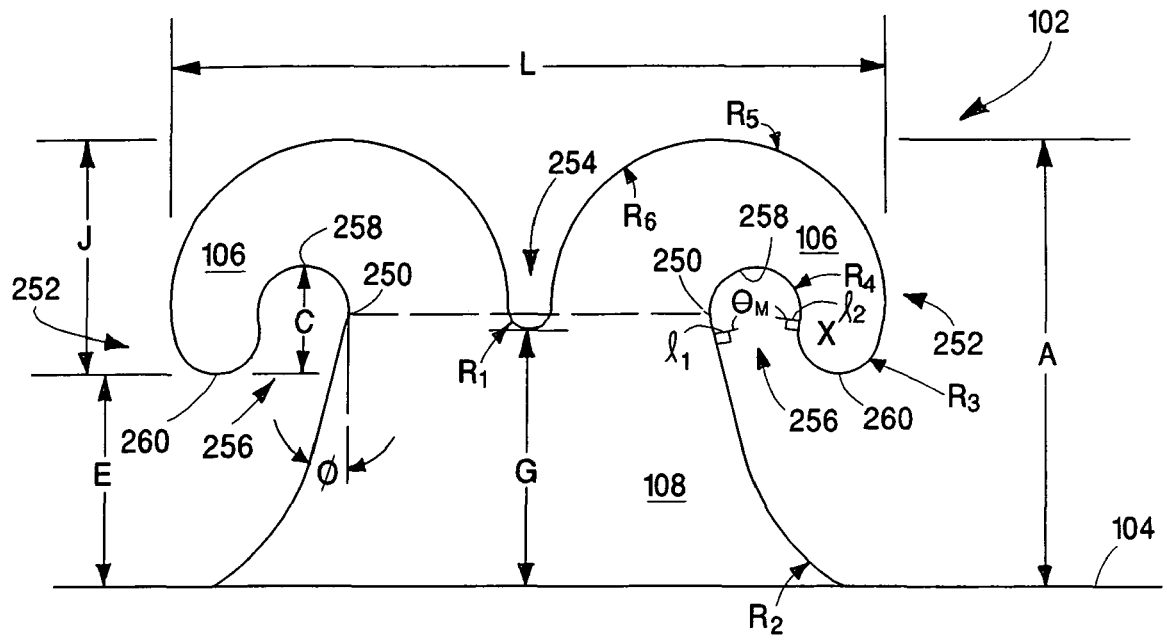
FIG. 3 is an enlarged side view of one of the fastener elements.
Figure 3A:
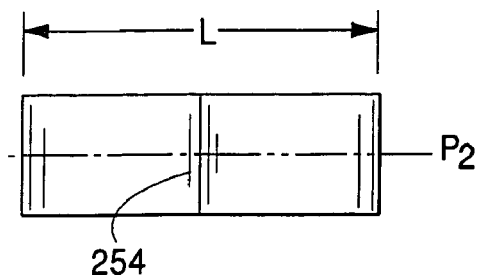
FIGS. 3A and 3B are top and end views, respectively, of the fastener element of FIG. 3.
Figure 3B:
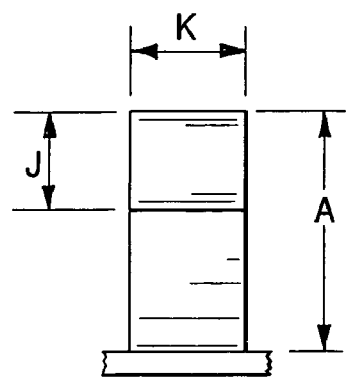

Referring now to FIGS. 3, 3A and 3B, fastener element 102 has a substantially constant thickness from base to tip, and includes a stem 108 extending outwardly from and molded integrally with sheet-form base 104. For purposes of the present disclosure, we refer to the stem 108 as beginning at the upper surface of base 104 and ending at an elevation where the inner crook surface is perpendicular to the base, an elevation 250 above which the inner crook surface begins to overhang the stem 108 or sheet-form base. Fastener element 102 also includes two heads 106 extending in essentially opposite directions in an engagement plane. Heads 106 extend from distal end 250 of the stem to corresponding, oppositely-directed tips 252. Thus, fastener element 102 is an example of what is known in the art as a 'palm-tree' fastener element. The heads 106 have upper surfaces that alone or together with the stem define a well 254 between the heads. Each head 106 has a lower surface that rises up through an apex 258 and then falls again, forming an arched crook 256 for retaining loops of a mating female touch fastener component.

The overall height A of fastener element 102 is measured in side view perpendicular to sheet-form base 104 from the top of the sheet-form base. Under crook height C is the distance measured in side view, perpendicular to the sheet-form base, between the lowermost extent of the tip 260 and the apex 258 of the crook. Entrance height E is the distance measured in side view, perpendicular to the sheet-form base, from the top of the sheet-form base to the lowermost extent of tip 260. If part of the stem is directly below the lowermost extent of the tip 260, then the distance is measured from that portion of the stem directly below to the lowermost extent of the tip 260. Head height J of fastener element 102 is measured perpendicular to sheet-form base 104 from the lowermost extent of tip 260 to the highest elevation of the head 106 above the base.

In general, J will be the difference between A and E. Well height G is measured in side view from the lower extent of stem 108 to the lower extent of well 254 defined in the upper surface of the fastener element between the heads.

Width L of the fastener element is measured in side view and is the maximum lateral extent of the fastener element heads 106 as measured parallel to the sheet-form base. Hook thickness K is the overall thickness of the fastener element, taken at elevation 250 corresponding to the upper end of stem 108. In most cases other than instances where the heads have been formed subsequent to stem molding, the heads will lie completely within this hook thickness K. In the example shown, hook thickness is the same at all elevations. The product of head width L and thickness K we call the footprint of the fastener element, and is related to the area of contact between the hook product and a mating loop product during initial engagement, although it will be understood to not be an exact measure of such contact area. The product of footprint and head height J (i.e., K×L×J) we refer to as displacement volume. For a more detailed explanation of the relevance of hook volume to fastener performance, see Provost, U.S. Pat. No. 5,315,740, the contents of which are incorporated herein by reference.

The front and rear surfaces of the stem define, in side profile, inclination angles $\phi$ of about 23 degrees with respect to vertical, with the width of the stem tapering to narrower away from the base, both for strength and ease of molding.

Under crook angle $\theta_m$ is an angle defined in the crook by inner surfaces of the head and stem, between a pair of line segments perpendicular to facing surfaces of the fastener element, in side view. Line segment $l_1$ is perpendicular to the forward edge of stem 108 at the elevation of the distal tip 260 of the head. Line segment $l_2$ is perpendicular to the under crook surface of the head at a point of inflection 'X' of the under head surface. In cases where there is not a smooth curvature transition inside the tip, such as where the underside of the head forms a sharp corner adjacent the tip, line segment $l_2$ should be taken as perpendicular to the underside surface of the head just above such a corner or discontinuity. As shown, angle $\theta_m$ is measured from the upper side of line segment $l_1$, about the crook, to the upper side of line segment $l_2$. For this illustrated example, $\theta_m$ is 201 degrees.

The linear and radial dimensions of the example illustrated in FIGS. 3, 3A and 3B are as follows:

| Dimension | Inches | Millimeters |
| --- | --- | --- |
| A | 0.025 | 0.635 |
| C | 0.0064 | 0.163 |
| E | 0.0105 | 0.267 |
| G | 0.0122 | 0.310 |
| J | 0.0145 | 0.368 |
| K | 0.012 | 0.305 |
| L | 0.0497 | 1.262 |
| $R_1$ | 0.0011 | 0.279 |
| $R_2$ | 0.0090 | 0.229 |
| $R_3$ | 0.0026 | 0.0660 |
| $R_4$ | 0.0040 | 0.102 |
| $R_5$ | 0.0107 | 0.272 |
| $R_6$ | 0.0164 | 0.417 |

These values result in a footprint of $5.96 \times 10^{-4}$ square inches (0.00385 cm$^2$), and a displacement volume of about $8.65 \times 10^{-6}$ cubic inches (0.000142 cm$^3$). Given a hook density of 380 fastener elements per square inch, the overall fastener component has an overall hook footprint of 22.6 percent of the overall array area.

Further description of the embodiment of FIG. 3 can be found in an application entitled "MULTIPLE-CROOK MALE TOUCH FASTENER ELEMENTS," filed concurrently herewith and assigned U.S. Ser. No. 10/688,320, the disclosure of which is hereby incorporated in full by reference.

Some examples have varying thickness, and non-planar sides. For example, the fastener element 102a of FIGS. 4, 4A and 4B has a greatest thickness at its base, and tapers in thickness to the distal tips of the heads. However, as seen in side view, fastener element 102a has the same profile as shown in FIG. 3, and approximately the same dimensions listed above also apply to this example.

Not all palm-tree fastener elements have two identical crooks. For example, some palm-tree fastener elements are intentionally formed to have one head extending up higher than the other, such as to engage loops of differing heights. Also, some palm-tree hooks are molded to have two identical crooks, but later processing alters one crook more than the other, such as discussed below.

Not all examples are of the 'palm-tree' variety. For example, the fastener element 302 of FIG. 5 defines only a single crook, and is thus an example of a 'J-hook' fastener element. In this case, head width L is taken from the forward-most edge of the hook head 306 to the rearmost extent of the hook stem 308. Otherwise, with the exception of well height G as inapplicable to J-hooks, the dimensions provided above with respect to FIG. 3 apply equally to the J-hook of FIG. 5. Fastener elements 302 can be arranged in rows extending from a sheet-form base 304, with hooks of adjacent rows facing in opposite directions. Other arrangements of such hooks are also envisioned.

Figure 5:
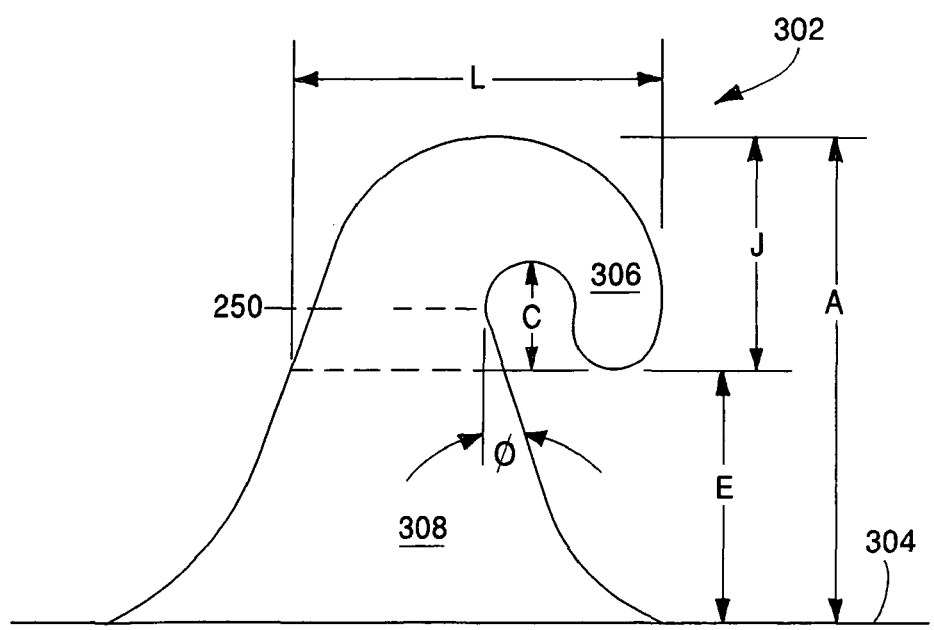
FIG. 5 is an enlarged side view of a J-hook fastener element.
Figure 4:
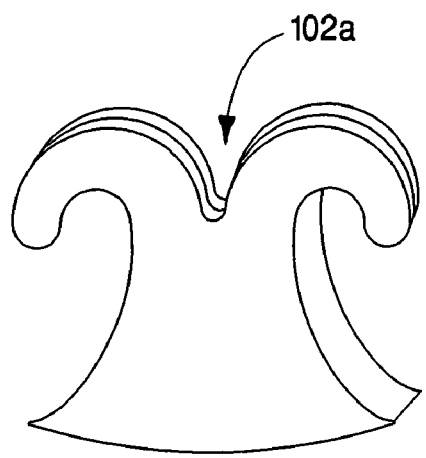
FIG. 4 is a perspective view of an alternate palm tree hook shape.
Figure 4A:
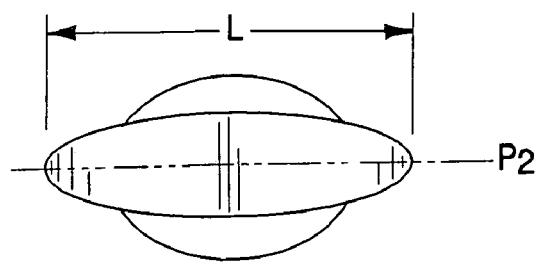
FIGS. 4A and 4B are top and end views, respectively, of the fastener element of FIG. 4.
Figure 6:
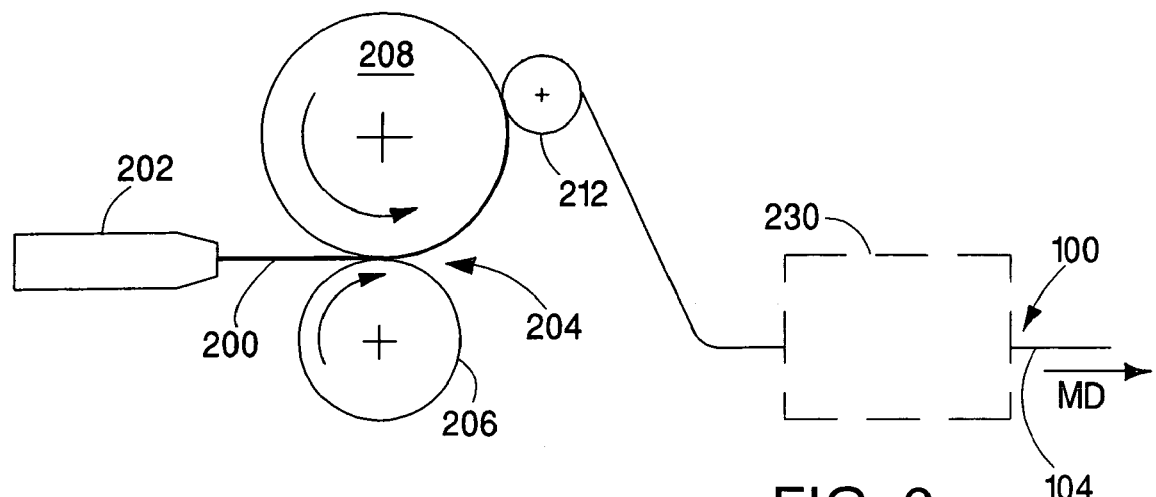
FIGS. 6 and 6A illustrate alternate molding processes for forming the fastener components.

The fastener elements of FIGS. 3-5 can be molded in the shapes shown. Referring to FIG. 6, thermoplastic resin 200 is extruded as a molten sheet from extruder 202 and introduced into nip 204 formed between a pressure roll 206 and a counter-rotating mold roll 208 defining fastener element-shaped cavities in its surface. Pressure in the nip causes thermoplastic resin 200 to enter these blind-ended forming cavities to form the fastener elements, while excess resin remains about the periphery of the mold roll and is molded between the rolls to form sheet-form base 104. The thermoplastic resin is cooled as it proceeds along the periphery of the mold roll, solidifying the fastener elements, until it is stripped by stripper roll 212. The molded fastener elements distend during de-molding, but tend to recover substantially their as-molded shape. It is generally understood that fastener element crooks molded to face downstream tend to distend slightly more than those molded to face upstream, and can remain more distended in the final product. The direction of travel of the material illustrated in FIG. 6 is referred to as the "machine direction" (MD) of the material and defines the longitudinal direction of the resulting product, while the cross-machine direction (CD) is perpendicular to the machine direction within the plane of the sheet-form base. Further details regarding processing are described by Fischer, U.S. Pat. No. 4,775,310 and Clune et al., U.S. Pat. No. 6,202,260, the disclosures of which are hereby incorporated in full by reference.

In some embodiments, the mold roll 208 comprises a face-to-face assembly of thin, circular plates or rings (not shown) that are, for example, about 0.003 inch to about 0.250 inch (0.0762 mm-6.35 mm) thick, some having cutouts in their periphery defining mold cavities and others having solid circumferences, serving to close the open sides of the mold cavities and serve as spacers, defining the spacing between adjacent fastener element rows. A fully "built up" mold roll may have a width, for example, from about 0.75 inch to about 6 inches (1.91 cm-15.24 cm) or more and may contain, for example, from about 50 to 1000 or more individual rings. Further details regarding mold tooling are described by Fisher, U.S. Pat. No. 4,775,310. Additional tooling embodiments will also be described below.

The cavities that made the fastener element shown in FIG. 3-3B have sharp edges and straight sidewalls and create fastener elements with substantially similar cross-sections through the thickness of the fastener element. Tooling with straight sidewalls and edges can be made by, for example, laser cutting, wire EDM or electroforming. Further details regarding laser cutting and wire EDM mold tooling is described by Fisher, U.S. Pat. No. 4,775,310. The electroforming process is described by Clarner et al., U.S. Ser. No. 10/455,240, the disclosure of which is hereby incorporated in full by reference.

Figure 4B:
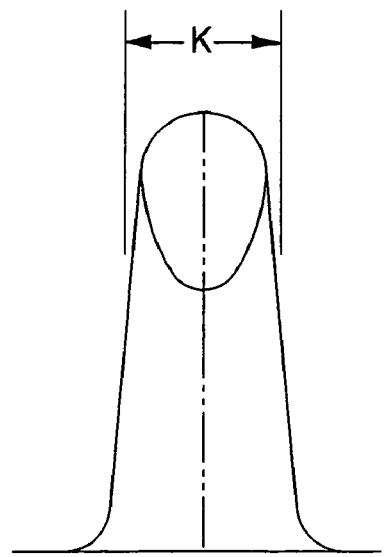

By contrast, fastener elements formed in cavities that have been, for example, photochemically etched may have rounded surfaces in some or all regions, from base to tip, such as those illustrated in FIGS. 4-4B. For example, surfaces at the top of the heads can be made to taper to a point to give a wedge effect. A wedge-shape may, for example, assist the entry of the crook into the face of a mating female fastener component. Further details regarding photochemical etching is described in Lacey et al., U.S. Pat. No. 6,163,939, the entire disclosure of which is hereby incorporated in full by reference.

Figure 6A:
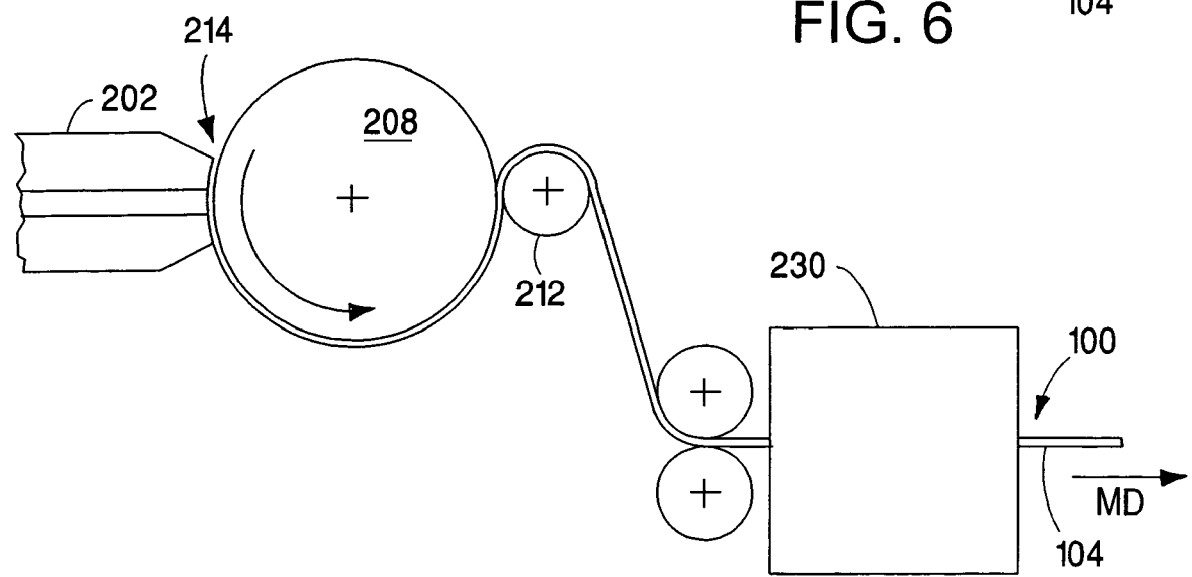

An alternate technique for molding fastener elements is shown in FIG. 6A. The process is similar to that described above with reference to FIG. 6, except only a mold roll 208 is used, i.e., no pressure roll 206 is necessary. Here, the extruder 202 is shaped to conform to the periphery of the mold roll 208 and the extruded resin 200 is introduced under pressure directly to a gap 214 formed between mold roll 208 and extruder 202. The molded fastener component is stripped from the mold cavities by a stripper roll 212 as described above. Further details regarding this process are described by Akeno, U.S. Pat. Nos. 5,781,969 and 5,913,482, the disclosures of which are hereby incorporated in full by reference.

Figure 7:
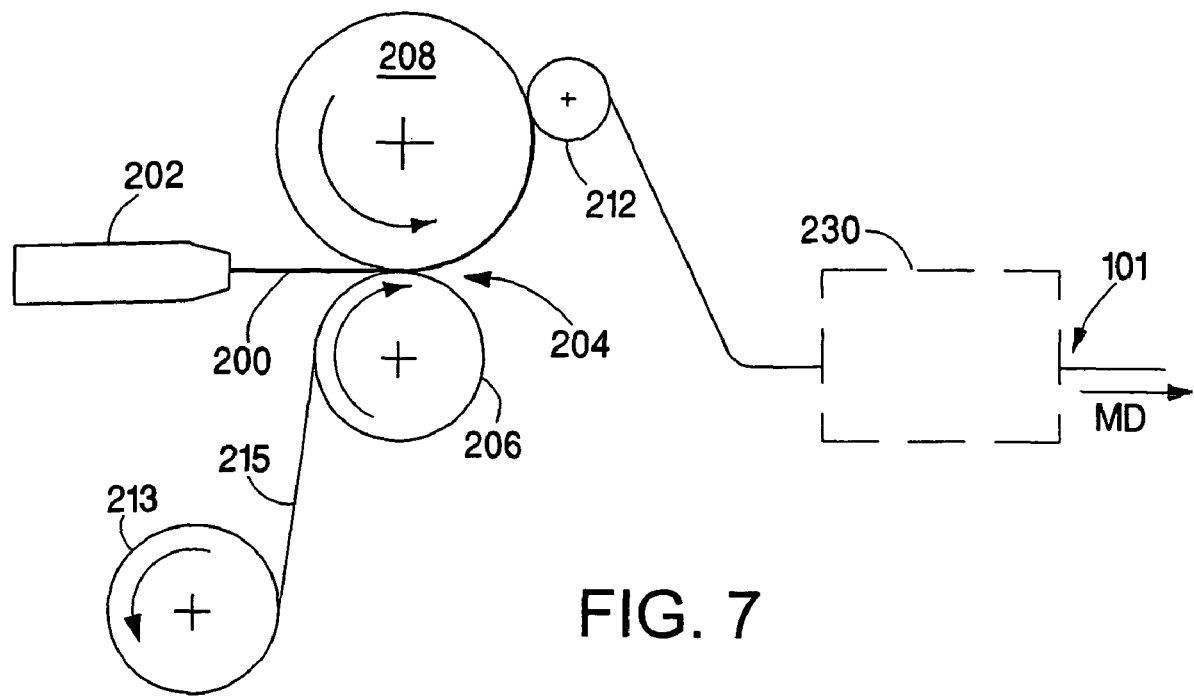
FIG. 7 illustrates a variation of the process of FIG. 6, for forming a laminated fastener.
Figure 7A:
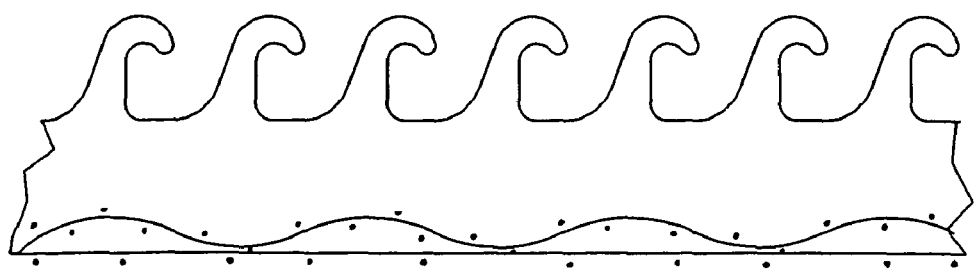
FIG. 7A is an enlarged cross-section of a product formed by the process of FIG. 7.

Referring to FIGS. 7 and 7A, a laminated male touch fastener component 101 may be formed by introducing a pre-form material 215 into nip 204 between the mold and pressure rolls. As a result of the heat and pressure in nip 204, pre-form material 215 becomes laminated and bonded to the thermoplastic resin 200 simultaneously with the forming of the fastener elements. The result can be a contiguous molded structure, without weld lines, extending from the tips of the fastener elements into the pre-form material, where the resin can intimately bond with features or fibers of the material to form a strong, permanent bond. Further details regarding this process are described by Kennedy et al., U.S. Pat. No. 5,260,015, the disclosures of which is hereby incorporated in full by reference.

In one useful embodiment, pre-formed material 215 is a loose knit scrim, such as Knit 3901 from Velcro USA in Manchester, N.H., although Velcro USA loop products 3900, 3905, and 3400 may also be employed. Knit 3901 is a 2 bar Tricot knit nylon fabric which generally must be brushed or napped before it can be employed as the functioning loop of a hook and loop closure. However, it has been found to function well as a reinforcement when at least partially encapsulated by, or bonded to, the base resin contiguous with the resin forming the hooks, without brushing or napping. Reinforcing the base with such a scrim has been found to improve the stitch tear strength of the product, providing a resin-base hook product practical for attachment by sewing or stitching. Further details regarding scrim materials are described an application entitled "PLASTIC SHEET REINFORCEMENT," filed concurrently herewith and assigned U.S. Ser. No. 10/688,301, the disclosure of which is hereby incorporated in full by reference.

In some cases, the fastener elements are not molded in their final form. In any of the methods disclosed above, for example, the fastener component may be routed through subsequent processing station 230 to finalize the form of the fastener elements. Such subsequent processing may include "flat-topping" overhanging fastener element preforms, as described by Provost, U.S. Pat. No. 5,953,797, and Akeno, U.S. Pat. No. 5,781,969, the disclosure of both of which is hereby incorporated in full by reference. In some cases, even straight molded stems may be subsequently processed to result in fastener elements having the properties disclosed herein. Flat-sided fastener elements with the profiles shown in FIGS. 3 and 5 can also be formed by a cut-and-stretch method, such as the method disclosed in Nestegard, U.S. Pat. No. 4,895,569, for example. In such processes, moldable resin is extruded through a die with openings shaped in the desired hook profile, then the extruded rails are cut transverse to the extrusion direction, and the base stretched in the extrusion direction to separate the rails into rows of discrete fastener elements. This procedure results in fastener elements with broad sides that are cut rather than molded, as in the processes described above, and with profile edges formed by sliding resin through a shaped die rather than a filling cavity.

A number of embodiments of the invention have been described. Nevertheless, it will be understood that various modifications may be made without departing from the spirit and scope of the invention. Accordingly, other embodiments are within the scope of the following claims.

What is claimed is:

1. A touch fastener component having a sheet-form base and an array of fastener elements, each fastener element comprising:
    a molded stem extending outwardly from and integrally with the sheet-form base, and
    a head extending forward from a distal end of the stem to a tip, the head having a lower surface forming a crook for retaining loops;
    wherein the head has an overall height, measured perpendicular to the sheet-form base from a lowermost extent of the tip to an uppermost extent of the head, that is greater than 55 percent of an overall height of the fastener element, measured perpendicular to the sheet-form base, and
    wherein a ratio of an overall height of the crook, measured perpendicular to the sheet-form base from a lowermost extent of the tip to an uppermost extent of the crook, to an entrance height measured perpendicular to the sheet-form base below a lowermost extent of the tip, is greater than 0.6.

2. The touch fastener component of claim 1 wherein each fastener element has multiple heads extending in different directions and forming separate crooks.

3. The touch fastener component of claim 2 wherein each fastener element has two heads extending in essentially opposite directions.

4. The touch fastener component of claim 3 wherein each fastener element defines an upper well between the two oppositely-directed heads, the well extending down to a height, measured perpendicularly from the base, of at least about 70 percent of the overall height of one of the two oppositely-directed heads.

5. The touch fastener component of claim 3 wherein each fastener element has an overall length between opposite extents of the oppositely-directed heads, measured parallel to the base, of at least 1.8 times the overall height of the fastener element.

6. The touch fastener component of claim 1 wherein the overall head height is less than 60 percent of the overall height of the fastener element.

7. The touch fastener component of claim 1 wherein the tip extends toward the base.

8. The touch fastener component of claim 1 wherein the lower surface of the head is arched.

9. The touch fastener component of claim 1 wherein the head and stem form a unitary molded structure.

10. The touch fastener component of claim 1 wherein the head has a surface of resin cooled against a mold surface.

11. The touch fastener component of claim 1 wherein the stem has opposing surfaces defined by severed resin.

12. The touch fastener component of claim 1 wherein the stem and head have side surfaces lying in parallel planes.

13. The touch fastener component of claim 1 wherein the crook overhangs a surface of the stem.

14. The touch fastener component of claim 13 wherein the overhung stem surface extends at an inclination angle of between about 20 and 30 degrees with respect to a normal to the base.

15. The touch fastener component of claim 1 further comprising a backing material laminated to a side of the base opposite the fastener elements.

16. The touch fastener component of claim 1 wherein the fastener elements are arranged in a density of at least 350 fastener elements per square inch of the base.

17. The touch fastener component of claim 1 wherein the fastener elements together cover at least 20 percent of an overall surface area of the base from which the fastener elements extend.

18. A touch fastener component having a sheet-form base and an array of fastener elements, each fastener element comprising:
    a molded stem extending outwardly from and integrally with the sheet-form base, and
    two heads extending in opposite directions from a distal end of the stem to corresponding tips, the heads having lower surfaces forming crooks for retaining loops;
    wherein at least one head has an overall height, measured perpendicular to the sheet-form base from a lowermost extent of the tip of the head to an uppermost extent of the head, that is greater than half of an overall height of the fastener element, measured perpendicular to the sheet-form base, and
    wherein a ratio of an overall height of each crook, measured perpendicular to the sheet-form base from a lowermost extent of the tip to an uppermost extent of the crook, to an entrance height measured perpendicular to the sheet-form base below a lowermost extent of the tip, is greater than 0.6.

19. The touch fastener component of claim 18 wherein both of the heads have overall heights that are greater than half of the overall height of the fastener element.

20. The touch fastener component of claim 18 wherein each fastener element defines an upper well between the two oppositely-directed heads, the well extending down to a height, measured perpendicularly from the base, of at least about 70 percent of the overall height of one of the two oppositely-directed heads.

21. The touch fastener component of claim 18 wherein each fastener elements has an overall length between opposite extents of the oppositely-directed heads, measured parallel to the base, of at least 1.8 times the overall height of the fastener element.

22. The touch fastener component of claim 18 wherein the overall head height is less than 60 percent of the overall height of the fastener element.

23. The touch fastener component of claim 18 wherein the crooks overhang surfaces of the stem, and wherein the overhung stem surfaces extend at an inclination angle of between about 20 and 30 degrees with respect to a normal to the base.

24. A touch fastener component having a sheet-form base and an array of fastener elements, each fastener element comprising:
    a molded stem extending outwardly from and integrally with the sheet-form base, and
    a head extending forward in an engagement direction from a distal end of the stem to a tip, the head having a lower surface forming a crook for retaining loops;
    wherein the fastener element has a bulk aspect, defined as a ratio of the product of an overall length of the fastener element, measured parallel to the sheet-form base in the engagement direction above an elevation of the tip, and fastener element thickness, measured parallel to the sheet-form base and the engagement direction at the elevation of the tip, to an overall height of the fastener element, measured perpendicular to the sheet-form base, of more than 0.020 inch (0.51 mm).

25. The touch fastener component of claim 24 wherein each fastener element has multiple heads extending in different directions and forming separate crooks.

26. The touch fastener component of claim 25 wherein each fastener element has two heads extending in essentially opposite directions, the overall length of the fastener element spanning the two oppositely-directed heads.

27. The touch fastener component of claim 26 wherein the overall length of the fastener element is at least 1.8 times the overall height of the fastener element.

28. The touch fastener component of claim 24 wherein a ratio of an overall height of the crook, measured perpendicular to the sheet-form base from a lowermost extent of the tip to an uppermost extent of the crook, to an entrance height measured perpendicular to the sheet-form base below a lowermost extent of the tip, is greater than 0.6.

29. The touch fastener component of claim 24 wherein the product of overall length and fastener element thickness, multiplied by a number of fastener elements disposed in an array on the base, is greater than about 20 percent of an area of the base populated by the array.

30. The touch fastener component of claim 24 wherein the crook overhangs a surface of the stem, and wherein the overhung stem surface extends at an inclination angle of between about 20 and 30 degrees with respect to a normal to the base.

31. A touch fastener component having a sheet-form base and an array of fastener elements, each fastener element comprising:
    a molded stem extending outwardly from and integrally with the sheet-form base, and
    a head extending forward from a distal end of the stem to a tip, the head having a lower surface forming a crook for retaining loops;
    wherein a ratio of an overall height of the crook, measured perpendicular to the sheet-form base from a lowermost extent of the tip to an uppermost extent of the crook, to an entrance height measured perpendicular to the sheet-form base below a lowermost extent of the tip, is greater than 0.6.

32. The touch fastener component of claim 31 wherein each fastener element has multiple heads extending in different directions and forming separate crooks.

33. The touch fastener component of claim 32 wherein each fastener element has two heads extending in essentially opposite directions.

34. The touch fastener component of claim 33 wherein each fastener element defines an upper well between the two oppositely-directed heads, the well extending down to a height, measured perpendicularly from the base, of at least about 70 percent of the overall height of one of the two oppositely-directed heads.

35. The touch fastener component of claim 33 wherein each fastener element has an overall length between opposite extents of the oppositely-directed heads, measured parallel to the base, of at least 1.8 times the overall height of the fastener element.

36. The touch fastener component of claim 31 wherein the crook overhangs a surface of the stem, and wherein the overhung stem surface extends at an inclination angle of between about 20 and 30 degrees with respect to a normal to the base.

37. The touch fastener component of claim 31 wherein the crook defines an under crook angle of at least 180 degrees.

38. The touch fastener component of claim 31 wherein the head has an overall thickness, measured parallel to the base and perpendicular to a plane of the crook, that is greater than the entrance height of the crook.

* * * * *